Oct. 22, 1935.  I. A. WEAVER  2,018,160
VEHICLE WHEEL TESTING APPLIANCE
Filed Oct. 15, 1934
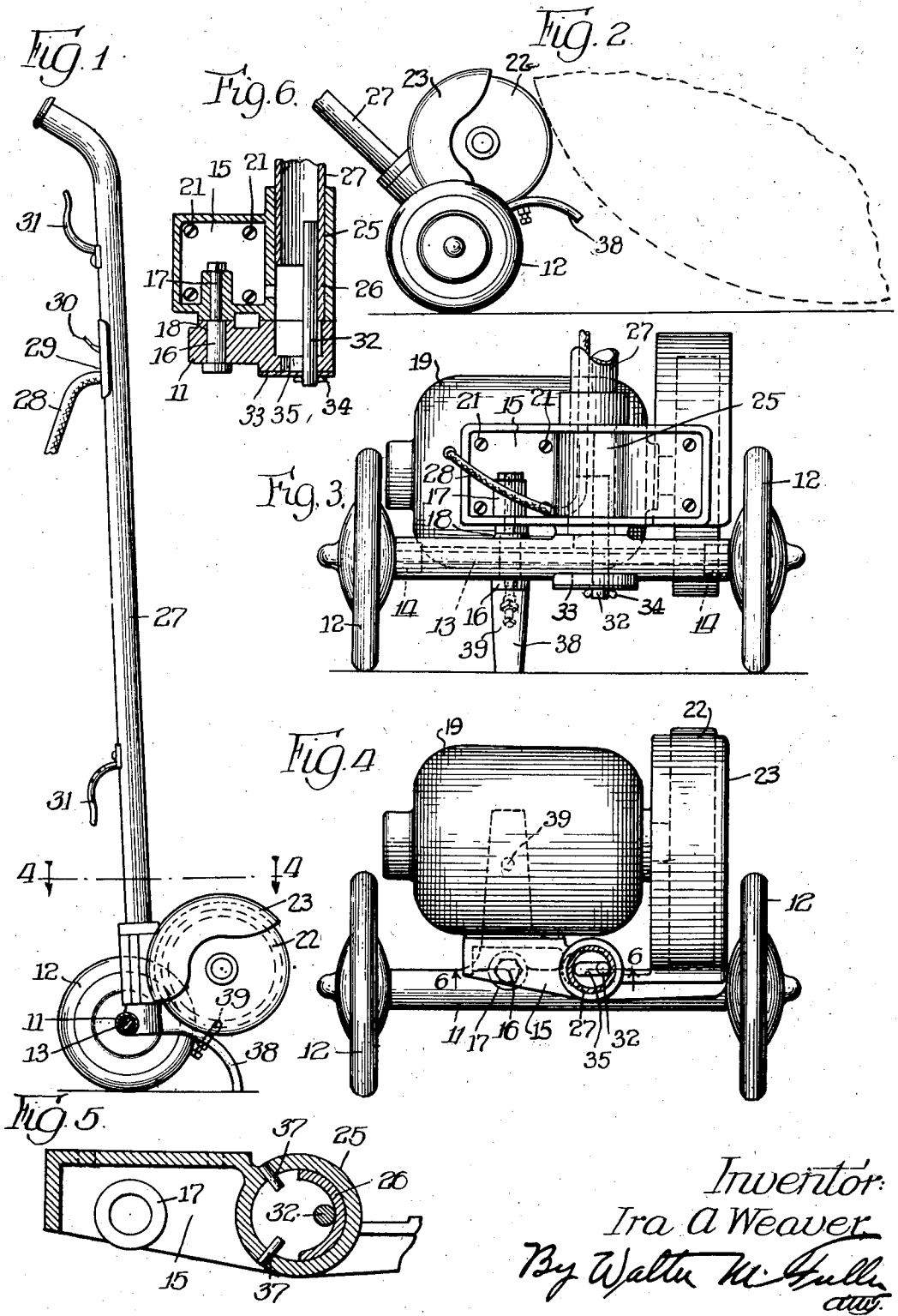
Inventor:
Ira A. Weaver
By Walter M. Fuller
atty.

Patented Oct. 22, 1935

2,018,160

UNITED STATES PATENT OFFICE 2,018,160

VEHICLE-WHEEL TESTING APPLIANCE

Ira A. Weaver, Springfield, Ill., assignor to I. A. Weaver Engineering Company, Springfield, Ill., a corporation of Illinois Application October 15, 1934, Serial No. 748,310

6 Claims. (Cl. 73—51)

One of the principal objects of the present invention is the provision of a simple, inexpensive, portable appliance for rotating an automobile-wheel at a relatively high speed to test its dynamic balance and at the same time to ascertain whether or not the wheel has either lateral or radial runout.

A further aim of the invention is to supply an apparatus of this character whose rotary driving wheel or disc can be easily and quickly adjusted, as by tilting, to be in the same plane as the vehicle-wheel which it rotates.

An added purpose of the invention is to furnish a device of the type indicated which is portable and to provide it with means so that it will readily stand in an upright position when not in use.

When either or both of the front wheels of an automobile is or are statically or dynamically out of balance and revolving at a high speed, the unbalanced force of such wheel tends to pivot or turn the wheel about its king-pin, thus causing the one or both wheels to exert an influence to constantly change the steering direction of the vehicle, this movement being so rapid, 600 to 1000 revolutions per minute, that the car does not have time to respond to the change of direction, with the result that the one or more wheels is or are constantly forced to slip sidewise, which action obviously quickly and unduly wears the tire tread, and, inasmuch as these movements occur in regular cycles during the wheel revolution, they tend to gouge spots or depressions in the tread of the tire.

Such unbalanced wheel condition also serves to excite and to produce shimmy and tramp in the car, the vibration in some cases being so great that the driver's hands become numbed from grasping the steering-wheel.

Radial eccentricity and lateral wabble causes the dirigible or steering front wheels of the vehicle to turn or pivot around the king-pins and to produce substantially the same effect as unbalanced wheel conditions.

Heretofore, when a person complained that his automobile shimmied or was subject to abnormal or excessive tire wear, it has been customary for the mechanic to drive the car at high speed on the highway to determine the actual conditions, a practice obviously both more or less expensive and somewhat dangerous.

Static balance cannot always be detected while the vehicle-wheel remains mounted on its spindle of the car due to possible brake drag, tight bearings, heavy grease, or friction of grease-retaining felt-washers, and, accordingly, to determine static wheel balance, the wheel is ordinarily removed from the car and placed on a balancing-stand, a procedure which is slow and relatively costly in time, and, even when the wheel is statically balanced, it may be out of balance dynamically.

While one of the main or leading aims of this invention is to supply an appliance which will permit the testing of the vehicle-wheel while it is on the car, nevertheless the apparatus may also be conveniently employed to spin a vehicle-wheel while mounted on a balancing-stand, such, for example, as is now in common use in tire-shops and in automobile service-stations.

For the accomplishment of the above stated and other desirable objects and purposes of the invention, I have devised the present preferred embodiment of my invention illustrated in the accompanying sheet of drawings and described and claimed below, and for simplicity like reference numerals have been used to designate the same parts throughout the several views.

In this drawing:—

Figure 1 is an elevation of the novel appliance in its upright, inactive position;

Figure 2 is a fragmentary view showing how the device is used to spin or rotate a vehicle-wheel;

Figure 3 is an enlarged elevation of the apparatus with the handle broken away;

Figure 4 is an enlarged horizontal section on line 4—4 of Figure 1;

Figure 5 is a sectional detail of the adjustable bracket on which the operating electric-motor and its driving wheel or roller are mounted; and Figure 6 is a section on line 6—6 of Figure 4.

By reference to this drawing, it will be noted that the new and improved testing or wheel-spinning appliance incorporates a hollow, horizontal cross-member or casting 11 equipped at its opposite ends with rubber-tired carrying-wheels 12, 12 which may be mounted thereon in any approved or convenient manner, as, for instance, by being affixed to the ends of an axle 13 extended through the tubular body 11 and revoluble in appropriate bearings 14, 14 inside of such casting.

A hollow bracket casting 15 is located above and bears on the member 11 and is hinged thereon or pivoted thereto near one of its ends by means of a bolt 16 extended through aligned apertures in the two parts, the one such aperture being located in a bearing 17 on the part 15 and the other in a boss 18 forming a portion of casting 11.

One part of such bracket above its hinge or pivot bolt carries an electric-motor 19 which is secured to the bracket by screws 21, 21, and this motor is adapted and designed to revolve a drive wheel or disc 22 partially housed in a guard or shield 23 fastened to the bracket by screws 24, the wheel or disc being desirably and conveniently mounted on the outwardly extended or protruding part of the shaft of the motor.

Bracket 15 has a bearing 25 receiving the lower curved section 26 of a tubular handle 27 of desirable longitudinal form and shape, the electric cable 28 through which the electric current is supplied to the motor entering the handle at the point 29 and leaving the handle at its lower end, as shown in Figure 3, where it is coupled or connected to the motor.

That portion of the cable external to the handle and which when in use is plugged into an electric outlet, may, when not in service, be mounted on the fixtures or hooks 31, 31, as is customary in connection with vacuum electric carpet sweepers.

The handle is also fitted with an electric-switch 30 which controls the operation of the motor in the usual way.

In order to tilt or angularly adjust the drive wheel or roller 22 and its motor in minor degree to bring the wheel into the true plane of the vehicle-wheel which it is to revolve, the interior of the handle at its lower part is fitted with a rod 32 welded or otherwise secured thereto to turn with the handle, the latter being properly retained in its bearing 25 by means of a washer 33 below casting 31 and held in place by a pin 34 through the lower end of rod 32.

Such rod extends through a slot 35 in an extension 36 of casting 11 at a point somewhat remote from the axis of the hinge or pivot bolt 16.

From an understanding of what precedes it will be apparent, that, when the handle is turned about its own axis in bearing 25 the rod or pin 32 will move with it, and since the slot 35 is stationary, such turning of the handle in the one direction or the other will correspondingly rock the bracket 15, the motor, and its driven disc or wheel 22 to tilt the latter in either one of opposite directions so that it may be easily and readily adjusted to the proper inclination to conform to that of the vehicle-wheel to be rotated thereby.

Stop pins 37, 37 located inside of the bearing 25 limit the degree of turning of the handle about its axis, as will be readily understood.

Casting 11 is provided with a foot 38 so that when the portable appliance is brought into a substantially vertical or upright position, as shown in Figure 1, it will maintain such position without falling over.

In order to support the motor more adequately, the leg or foot 38 is provided with an adjustable screw 39 bearing against the motor-casing and thereafter assisting in the support of the motor.

This new portable appliance is used substantially as follows:

Either one or both of the front wheels of the vehicle is or are elevated from the floor as by a jack and the new device incorporating this invention is moved into position so that the power-driven wheel 22 is held firmly against the center of the tread of the wheel tire.

Thereupon the handle is turned about its own axis to the right or left to bring such drive wheel into the same plane as the vehicle-wheel of the car which may be out of a true vertical plane due to the tip of the axle on the jack or to the camber of the wheel or both.

The switch is then closed and the wheel is driven by the motor at a high speed which may be as great as a road speed or from 80 to 100 miles per hour, this being accomplished in a few seconds.

If the unbalanced force in the spinning vehicle-wheel is very great, the entire automobile will be violently shaken because this force acts rearwardly and forwardly as well as upwardly and downwardly during each revolution of the wheel, causing the wheel to pivot about its kingpin due to any slack or give in the steering-mechanism.

The automobile wheel is then allowed to decelerate when rates of vibration will tune with certain parts of the car which can be readily noted.

The opposite wheel may also be spun while the first wheel is still revolving, and, if both wheels are out of balance, their unbalanced forces will meet or coincide at certain periods, producing a substantially marked effect due to the fact that one wheel is rotating faster than the other.

If the wheel-bearings are badly worn, this condition can usually be detected while the test for balance is being made.

Lateral runout or wabble can be quickly determined by the travel of the face of the tire across the driving wheel, and, if the vehicle-wheel has a radial eccentricity, there will be a violent pounding effect on the testing appliance.

Thus the condition of the vehicle-wheel may be comparatively easily ascertained merely by spinning it at a high speed by this new portable apparatus.

It is to be understood that various changes may be incorporated in the device shown and described without departing from the heart and essence of the invention as defined by the appended claims and without the loss of any of its material benefits.

I claim:

1. In a portable, vehicle-wheel, testing appliance adapted to be used with a vehicle-wheel raised from the floor or ground by means structurally separate from the testing appliance, the combination of a support, a single revoluble driving-wheel on said support adapted to engage the tread of a vehicle-wheel without supporting such wheel and to rotate the vehicle-wheel at high speed when the weight of the vehicle is removed from the wheel, and means on said support to revolve said driving-wheel at the required speed.

2. The construction presented in claim 1 in combination with means to adjustably tilt said driving-wheel to permit it to conform to the plane of the vehicle-wheel which it is to rotate.

3. The construction presented in claim 1 in combination with a handle mounted on said support to turn about its own axis, and means operated by such turning of said handle to adjustably tilt the driving-wheel to permit it to conform to the plane of the vehicle-wheel which it is to rotate.

4. In a portable, vehicle-wheel, testing appliance adapted to be used with a vehicle-wheel raised from the floor or ground by means structurally separate from the testing appliance, the combination of a wheeled-truck, a bracket hinged on said truck, an electric-motor and a drive-wheel rotated by said motor both mounted on said bracket, a handle for said truck mounted on said bracket to turn about its own axis, and means actuated by said turning of the handle to rock said bracket on its hinge to adjustably tilt said drive-wheel to permit the latter to conform to the camber slope of the vehicle-wheel which it is to rotate.

5. The structure presented in claim 1 in which said support has a leg to engage the floor to maintain the appliance in a substantially upright position when not in use.

6. The structure presented in claim 4 in which said truck has a leg to engage the floor when the appliance is in a substantially upright position to support it against tipping over from such position.

IRA A. WEAVER.